United States Patent [19]

Smith et al.

[11] Patent Number: 5,105,694
[45] Date of Patent: Apr. 21, 1992

[54] ADJUSTABLE MULTIPLE SPINDLE MACHINE TOOL

[75] Inventors: Stephen P. Smith, Lansing; Donald W. Garnett, Grand Ledge, both of Mich.

[73] Assignee: The Olofsson Corporation, Lansing, Mich.

[21] Appl. No.: 605,123

[22] Filed: Oct. 25, 1990

[51] Int. Cl.⁵ .............................................. B23B 21/00
[52] U.S. Cl. .................................... 82/138; 82/129; 82/133; 82/118
[58] Field of Search ................. 82/11.1, 118, 134, 132, 82/133, 137, 138, 141, 158, 129; 409/219

[56] References Cited

U.S. PATENT DOCUMENTS

| | | | |
|---|---|---|---|
| 2,627,196 | 2/1953 | Marsilius | 82/138 |
| 3,183,782 | 5/1965 | Mills | 409/219 |
| 3,315,550 | 4/1967 | Kylin | 82/133 |
| 3,358,535 | 12/1967 | Hirschfeld et al. | 82/137 |
| 3,937,110 | 2/1976 | Renoux | 82/138 |
| 4,197,769 | 4/1980 | Smith et al. | 82/129 |
| 4,475,421 | 10/1984 | Cudnohufsky | 82/138 |
| 5,005,452 | 4/1991 | Wood, III | 82/138 X |

Primary Examiner—Larry I. Schwartz
Assistant Examiner—Julie R. Daulton
Attorney, Agent, or Firm—Barnes, Kisselle, Raisch, Choate, Whittemore & Hulbert

[57] ABSTRACT

A machine tool has a main slide movable along a first path and a cross-slide assembly movable perpendicular to the path of the main slide. The cross-slide assembly has a first slide unit which is directly driven by a primary servo control. The cross-slide assembly has a second slide unit driven by the first slide unit through a spring-loaded follower acting against a cam which can transmit numerically-controlled offset to the second slide unit such that both slide units will follow identical paths. The cam is adjustable to enable correction of the offset. Each slide unit carries a cutting tool. The invention is applicable to multiple spindle machines having two or more spindles.

9 Claims, 2 Drawing Sheets

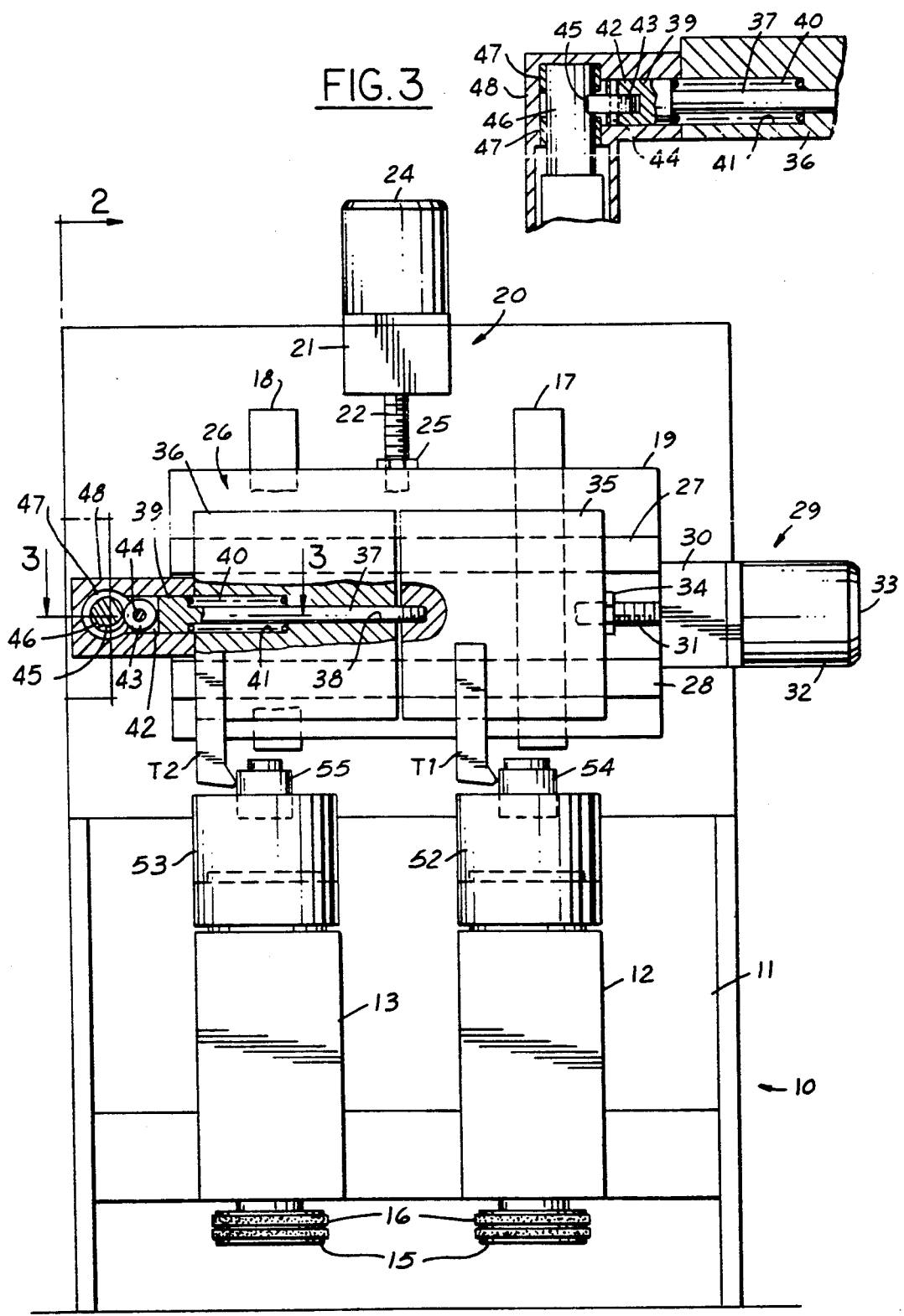

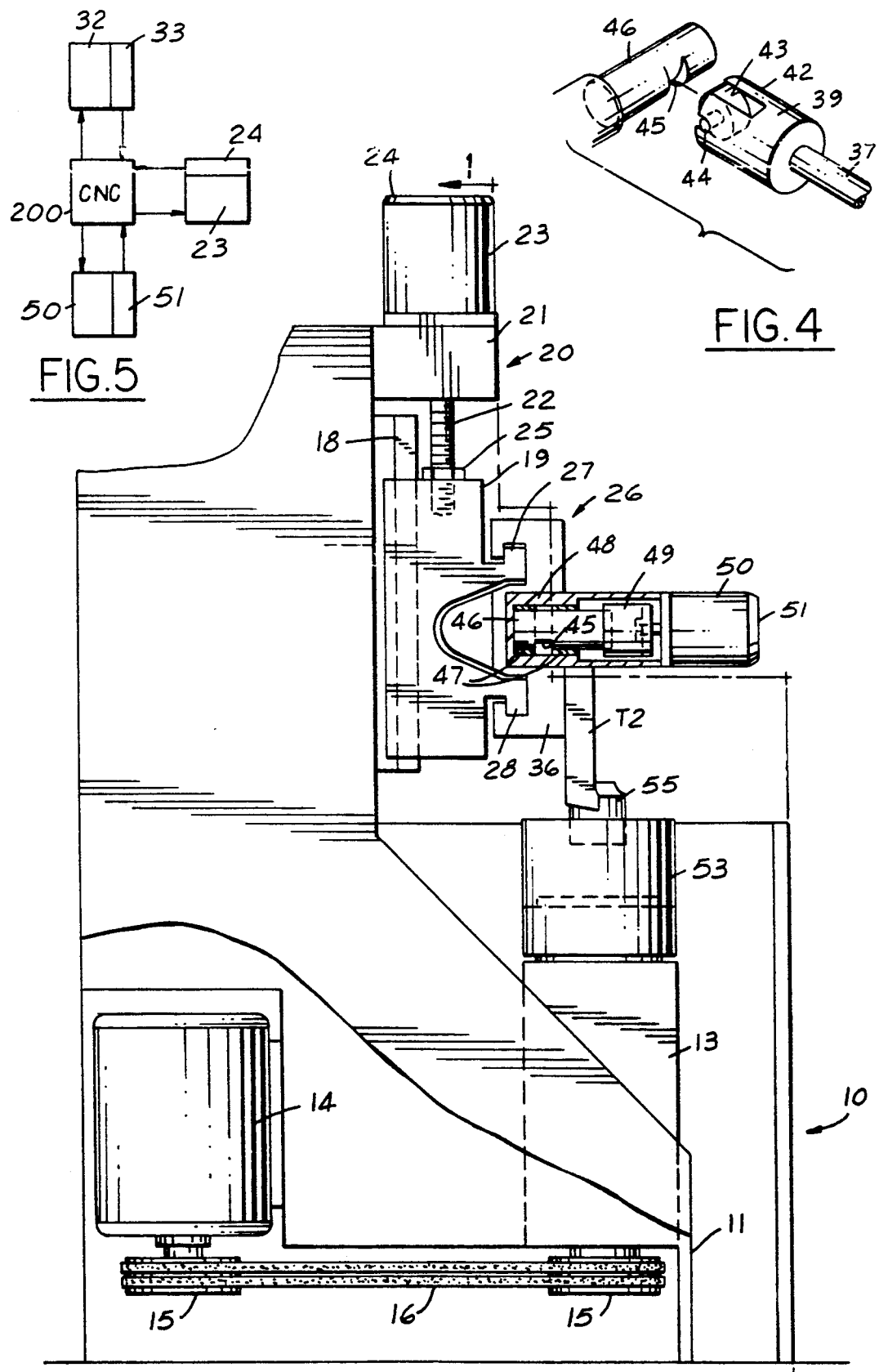

ADJUSTABLE MULTIPLE SPINDLE MACHINE TOOL

This invention relates generally to machine tools and refers more particularly to multiple spindle machine tools and the offset adjustment of the tools thereof.

BACKGROUND

Multiple spindle machine tools in industry often use a single set of cartesian axis slides to mount the tools for simultaneously machining two or more identical parts. Since all of the tools are mounted on one of the slides and move together, they must be correctly positioned at a distance from each other which is exactly equal to the spacing of the work spindles in order to cut identical parts. Tool variations and tool wear make it difficult to manually make critical tool adjustments and maintain the adjustment throughout the life of the tool.

One method of adjusting a second tool or set of tools, as well as additional tools or tool sets, in relation to a first tool or set of tools, is to provide completely separate cartesian axis slide systems. However, this duplication of slides, servo drive systems and numerical controls is expensive and cumbersome.

In some cases, tool compensating slides have been mounted on top of the main slide system. This results in increased stand-off of the tools from their guiding slides and causes a loss in the rigidity of the tool mounting, which is detrimental to precision machining.

SUMMARY

This invention provides a precise means of remote adjustment of a second tool or set of tools (and also additional tools or sets of tools) in relation to a first tool or set of tools at minimum expense. The invention permits the offset of a second or additional tool in relation to a first tool without imposing one slide on top of another and requiring only one primary slide system, one primary servo drive, and one primary numerical control.

Objects, features and advantages of this invention are to provide a machine tool having the above features, and one which is rugged, durable, relatively inexpensive, and easy to manufacture and operate.

Other objects, features and advantages of the invention will become more apparent as the follow description proceeds, especially when considered with the accompanying drawings.

BRIEF DESCRIPTION OF THE DRAWINGS

FIG. 1 is a front elevational view of a two spindle machine with parts in section along the line 1—1 in FIG. 2.

FIG. 2 is a side elevational view partly in section along the line 2—2 of FIG. 1.

FIG. 3 is a sectional view taken on the line 3—3 in FIG. 2.

FIG. 4 is an exploded perspective view of the cam and cam follower structure shown in FIG. 3.

FIG. 5 is a flow chart showing the numerical control and servo drives employed in the operation of the machine tool.

DETAILED DESCRIPTION

Referring now more particularly to the drawings, there is shown a two spindle machine tool generally designated by the numeral 10. The machine tool has a machine base 11 on which are mounted parallel, spaced apart spindles 12 and 13. Spindles 12 and 13 are driven by a motor 14, sheaves 15 and belts 16. While a machine with only two spindles is shown, the machine could have three or more spindles, if desired.

A main slide 19 is mounted on the base 11 for vertical sliding movement on laterally spaced apart, vertical ways 17 and 18.

A ball screw drive 20 is provided to raise and lower the main slide 19. The ball screw drive comprises a ball screw support housing 21 mounted on base 11 which supports ball screw 22 for rotary motion but prevents linear motion thereof. Ball screw 22 is driven by servo motor 23, also mounted on ball screw housing 21. The servo motor is driven and controlled by a numerical control 200 which is programmed to drive the servo motor 23 for precise movement and positioning of the slide 19. A rotary encoder 24 on the upper section of the servo motor 23 feeds back information with respect to ball screw rotation and hence the position of slide 19 to the numerical control 200 which makes any correction that may be necessary. A ball nut 25 attached to the main slide 19 threadedly engages ball screw 22 so that rotation of ball screw 22 causes vertical translation of slide 19.

A cross-slide assembly generally designated 26 is mounted on main slide 19 for horizontal sliding movement on horizontal ways 27 and 28. A ball screw drive 29 is provided for moving the cross-slide assembly 26. The ball screw drive has a ball screw support housing 30 mounted on main slide 19 which supports a ball screw 31 for rotation but prevents linear motion thereof. Ball screw 31 is driven by a servo motor 32 also mounted on the ball screw support housing 30. The servo motor 32 is driven and controlled by the numerical control 200 which is programmed to drive the servo motor 32 for precise movement and positioning of the cross-slide assembly 26. A rotary encoder 33 on the servo motor 32 feeds back information with respect to ball screw rotation and hence the position of cross-slide assembly 26 to the numerical control 200 which makes any correction that may be necessary. A ball nut 34 attached to the cross-slide assembly 26 threadedly engages the ball screw 31 so that rotation of the ball screw results in horizontal translation of the cross-slide assembly 26.

The system thus far described constitutes a primary drive system of the machine tool 10.

The cross-slide 26 is composed of a first cross-slide unit 35 attached directly to the ball nut 34 and a second cross-slide unit 36. Both cross-slide units 35 and 36 are mounted on the same ways 27 and 28.

An elongated rod 37 extends through a horizontal passage 38 in the cross-slide unit 36 and has one end affixed to the cross-slide unit 35 as by threading. The opposite end of the rod 37 has a head 39. A spring 40 compressed between the head 39 and the base of a counter-bore 41 in passage 38 urges the cross-slide unit 36 towards the cross-slide unit 35. While the spring 40 is preferred, other means, such as a fluid cylinder, could be employed.

The head 39 of rod 37 has a slotted yoke 42 which receives a cam follower in the form of a circular wheel 43 rotatably mounted on a pin 44 extending across the space between the arms of the yoke. The periphery of the cam follower wheel 43 is engaged by a cam 45 of cam shaft 46. Cam shaft 46 is supported for rotation by journal bearings 47 in a housing 48 mounted on the cross-slide unit 36.

The cam shaft 46 is driven by a servo motor 50 through a harmonic gear reducer 49. Servo motor 50 is driven by and controlled by the numerical control 200 which is programmed to drive the servo motor 50 for precise rotation of cam 45 and movement of cross-slide unit 36 relative to cross-slide unit 35. A rotary encoder 51 on the end of the servo motor 50 feeds back information with respect to the rotary position of the cam 45 to the numerical control 200 which makes any correction that may be necessary. Movement of the cross-slide unit 36 toward cross-slide unit 35 under the pressure of spring 40 is limited by and controlled by the rotary position of cam 45.

The servo motor 32 and ball screw drive 29 provide a direct drive to the cross-slide unit 35. The cross-slide unit 36 is driven indirectly by cross-slide unit 35 through the rod 37, spring 40, cam follower 43 and cam 45. The cam is adjustable by servo motor 50 to correct or adjust the offset of cross-slide unit 36 relative to cross-slide unit 35.

Individual tools T1 and T2 are rigidly mounted on cross-slide units 35 and 36 respectively. Chucks 52 and 53 are mounted on spindles 12 and 13, respectively, and clamp identical parts 54 and 55.

In operation, the numerical control 200 is programmed to drive the main slide servo motor 23 and cross-slide servo motor 32 such that tool T1 describes the desired machine contour for part 54. Then by means of the rod 37, compression spring 40, cam follower 43 and cam 45, the cross-slide unit 36 and its tool T2 will follow in the same path as cross-slide 35 and its tool T1, to machine part 55 to the same contour at part 54.

If the spacing of tools T1 and T2 is not correct, servo motor 50 is commanded to rotate cam 45 and thereby offset the slide 36 and its tool T2 the appropriate amount by entering the correct offset in the offset tables of the numerical control 200.

In practice, tool offsets may also be needed in the tool offset tables of control 200 to correct the machined size of part 54. When this offset is made, the numerical control 200 automatically offsets cross-slide unit 36 and its tool T2 in the opposite direction and by the same amount, by servo controlled cam 45, ending with tool T2 returning to its original position before tool T1 is offset.

When extreme accuracy is required, the mis-positioning effect of "friction-hysterisis" of the slides is overcome by a programmed routine in which all slides are backed off a given distance and then programmed to the desired new position. This program results in approaching the final position always from the same direction and the hysterisis positioning offset becomes a constant programmable factor.

What is claimed is:

1. In a machine tool, a slide assembly, means mounting said slide assembly for reciprocation along a predetermined path, said slide assembly comprising a first slide unit and a second slide unit, adjustable connecting means for adjustably positioning said slide units relative to one another along a line parallel to said predetermined path and for retaining said slide units in adjusted offset position, drive means for reciprocating said slide assembly along said predetermined path, means connecting said drive means to said first slide unit to provide a direct drive to the latter, said second slide unit being driven by said first slide unit indirectly through said adjustable connecting means, a cutting tool mounted on each slide unit, said adjustable connecting means comprising a cam follower, means mounting said cam follower on one of said slide units, an adjustable cam, means mounting said cam on the other of said slide units, drive means for adjusting said cam, and means urging said cam and cam follower into contact with one another.

2. The machine tool defined in claim 1, comprising a numerical control for driving and controlling said drive means for said slide assembly and said drive means for said cam, and encoder means for feeding back information regarding the position of said slide assembly and of said cam to said numerical control to correct said numerical control.

3. The machine tool defined in claim 2, including a main slide on which said slide assembly is mounted for reciprocation as aforesaid, means mounting said main slide for reciprocation along a second path perpendicular to said predetermined path, drive means for reciprocating said main slide, said numerical control driving and controlling said drive means for said main slide, and encoder means for feeding back information regarding the position of said main slide to said numerical control to correct said numerical control.

4. In a machine tool, a slide assembly, means mounting said slide assembly for reciprocation along a predetermined path, said slide assembly comprising a first slide unit and a second slide unit, adjustable connecting means for adjustably positioning said slide units relative to one another along a line parallel to said predetermined path and for retaining said slide units in adjusted offset position, drive means for reciprocating said slide assembly along said predetermined path, means connecting said drive means to said first slide unit to provide a direct drive to the latter, said second slide unit being driven by said first slide unit indirectly through said adjustable connecting means, a cutting tool mounted on each slide unit, said adjustable connecting means comprising a rod connected to said first slide unit and extending parallel to said predetermined path, cam means comprising a cam follower member and an adjustable cam member, means mounting one of said members on said rod, means mounting the other of said members on said second slide unit, drive means for adjusting said cam member, and means urging said cam member and cam follower member into contact with one another.

5. The machine tool defined in claim 4, wherein said means urging said cam member and cam follower into contact with one another comprises a spring interposed between said rod and said second slide unit.

6. The machine tool defined in claim 5, comprising a numerical control for driving and controlling said drive means for said slide assembly and said drive means for said cam member, and encoder means for feeding back information regarding the position of said slide assembly and of said cam member to said numerical control to correct said numerical control.

7. The machine tool defined in claim 6, wherein said mounting means for said slide assembly comprises common ways on which both said slide units are mounted.

8. The machine tool defined in claim 7, including a main slide on which said slide assembly is mounted for reciprocation as aforesaid, means mounting said main slide fore reciprocation along a second path perpendicular to said predetermined path, drive means for reciprocating said main slide, said numerical control driving and controlling said drive means for said main slide, and encoder means for feeding back information regarding the position of said main slide to said numerical control to correct said numerical control.

9. In a machine tool, a slide assembly comprising a first slide unit and a second slide unit, means mounting said first and second slide units for reciprocation along a predetermined path, drive means having a direct drive to said first slide unit to reciprocate said first slide unit along said predetermined path, connecting means connecting said second slide unit to said first slide unit for movement of said second slide unit along said predetermined path in unison with and in the same direction as said first slide unit, said connecting means including adjustment means for adjustably positioning said second slide unit relative to said first slide unit along a line parallel to said predetermined path and for retaining said slide units in adjusted position relative to one another during movement thereof along said predetermined path, said adjustment means comprising first and second adjustment members carried by said respective first and second slide units, said adjustment members being in adjustable engagement with one another, drive means for adjusting the engagement of said first and second members and a cutting tool mounted on each slide unit.

* * * * *